United States Patent
Takafuji et al.

(10) Patent No.: US 7,036,621 B2
(45) Date of Patent: May 2, 2006

(54) PEDESTRIAN-VEHICLE COLLISION DETECTING APPARATUS

(75) Inventors: Tetsuya Takafuji, Anjo (JP); Yoshiyuki Hattori, Toyoake (JP)

(73) Assignee: Denso Corporation, Kariya (JP)

( * ) Notice: Subject to any disclaimer, the term of this patent is extended or adjusted under 35 U.S.C. 154(b) by 177 days.

(21) Appl. No.: 10/725,270

(22) Filed: Dec. 2, 2003

(65) Prior Publication Data

US 2004/0108157 A1    Jun. 10, 2004

(30) Foreign Application Priority Data

Dec. 3, 2002    (JP)    ............... 2002-351545

(51) Int. Cl.
*B60Q 1/00*    (2006.01)
*B60K 1/00*    (2006.01)

(52) U.S. Cl. ............... 180/274; 280/735; 340/436

(58) Field of Classification Search ............... 180/274; 280/735; 340/436

See application file for complete search history.

(56) References Cited

U.S. PATENT DOCUMENTS

| | | | |
|---|---|---|---|
| 6,561,301 B1* | 5/2003 | Hattori et al. | 180/274 |
| 6,744,354 B1* | 6/2004 | Stephan et al. | 340/436 |
| 6,802,556 B1* | 10/2004 | Mattsson et al. | 296/187.09 |

FOREIGN PATENT DOCUMENTS

| | | |
|---|---|---|
| JP | 8-216826 | 8/1996 |
| JP | 11-28994 | 2/1999 |
| JP | 11-310095 | 11/1999 |
| JP | 2002-36994 | 2/2002 |

* cited by examiner

*Primary Examiner*—Paul N. Dickson
*Assistant Examiner*—George D. Spisich
(74) *Attorney, Agent, or Firm*—Posz Law Group, PLC

(57) ABSTRACT

A pedestrian collision detecting apparatus for motor vehicles is provided which works to distinguish between impacts with pedestrians and other sorts of impacts using a combination of a collision duration for which a sensor continues to sense a physical impact arising from collision with an object and a time-sequential change in locations of collisions of the vehicle with objects, thereby ensuring the reliability of detection of a pedestrian-vehicle collision and allowing the size and production costs of the apparatus to be minimized to improve the mountability of the apparatus in motor vehicles.

7 Claims, 11 Drawing Sheets

FIG. 8(b) UPON COLLISION

PEDESTRIAN-VEHICLE COLLISION DETECTING APPARATUS

BACKGROUND OF THE INVENTION

1. Technical Field of the Invention

The present invention relates generally to a pedestrian-vehicle collision detecting apparatus, and more particularly to a simple and power-saving structure of such a pedestrian-vehicle collision detecting apparatus.

2. Background Art

There have been proposed automotive pedestrian impact guard systems which have a vehicle-pedestrian collision detector installed in a front bumper of the vehicle. The vehicle-pedestrian collision detector works to detect an accidental collision with a pedestrian during traveling of the vehicle and trigger deployment of an airbag mounted on an upper surface of the front of the vehicle or lift up the hood of the vehicle to absorb physical impact acting on, especially the head of the pedestrian falling onto the upper surface of the front of the vehicle.

For example, Japanese Patent First Publication Nos. 8-216826 and 11-310095 disclose the above type of vehicle-pedestrian collision detectors. The detector, as taught in the former publication, has an impact sensor made up of conductive rubber plate in which metallic fine particles are mixed and electrodes affixed to the conductive rubber plate. The impact sensor is installed over a length of the front bumper of the vehicle and works to detect impact with a pedestrian correctly even if the pedestrian hits any portion of the front bumper. The detector, as taught in the latter publication, has a pressure sensor equipped with an elastic tube filled with gas and works to sense occurrence of a collision with the pedestrian upon elevation in internal pressure of the elastic tube.

The above vehicle-pedestrian collision detectors, however, have a difficulty in distinguishing between impacts with pedestrians and other sorts of impacts. In order to avoid this problem, Japanese Patent First Publication No. 11-028994 proposes use of a combination of a collision impact (or collision-caused deformation of a sensor), an impact duration, and a vehicle speed. Japanese Patent First Publication No. 11-310095 proposes use of a combination of a collision-caused deformation of a sensor, a change in such deformation with time, and a vehicle speed. Specifically, systems, as taught in these publication, are designed to use a typical phenomenon that when hit by the vehicle, pedestrians are usually struck up from the vehicle, that is, that immediately after such a collision, legs of the pedestrian are kicked up by the bumper of the vehicle, so that after reaching a peak subsequent to the collision, the magnitude of impact load sensed by the sensor or the degree of deformation of the sensor attenuates.

The inventors of this application have found in the above systems that a period of time until the magnitude of impact load or degree of deformation exceeds a given threshold value (will referred to as a collision duration below) depends upon a positional relation between right and left legs of pedestrians upon collision with the vehicle.

Usually, when the vehicle is traveling at approximately 40 km/h, a period of time between when only one leg of the pedestrian is hit by the bumper and a time when the leg is struck or kicked up by the bumper, or a period of time between when both legs of the pedestrian (which are aligned with a travel direction of the vehicle) hit the bumper and a time when the legs are kicked up by the bumper are on the order of 10 to 20ms. In the latter case, when kicked up by the bumper, one of the pedestrian's legs in contact with the bumper strikes the other leg. The collision duration is, thus, substantially identical with that in the former case.

However, in most cases, both legs of pedestrians are not arrayed parallel to the bumper upon collision with the vehicle, so that the collision duration depends greatly upon distances between one of the legs and the bumper and between the other leg and the bumper. The time when the above described magnitude of impact load or the degree of deformation decreases below the threshold value (i.e., the end of the collision duration) is, therefore, much later than that when only one of the legs or the legs aligned to the travel direction of the vehicle are kicked up by the bumper.

The collision duration in a case where a pedestrian is walking perpendicular to a travel direction of the vehicle, and legs of the pedestrian are not aligned with the travel direction of the vehicle upon a hit against the vehicle will be described below with reference to FIGS. 1 and 2.

FIG. 1 illustrates a positional relation between legs of a pedestrian and a motor vehicle immediately before the pedestrian is hit by the vehicle. The right leg L1 is closer to the bumper of the vehicle (i.e., a line sensor installed on the front of the vehicle) than the left leg L2 by about 150 mm. In this example, the collision duration $\Sigma T$ for which the sensor continues to sense impact with the pedestrian is, as shown in FIG. 2, given substantially by the sum of a right leg-collision duration $\Delta T1$ and a left leg-collision duration $\Delta T2$ and approximately two times longer than that when only one of the legs L1 and L2 is hit by the vehicle. For instance, when the vehicle is traveling at 40 km/h, the collision duration will be more than 35 msec, thus resulting in a great increase in time required to discriminating between impacts with pedestrians and other types of impacts based on the attenuation of the above described impact load or the deformation.

However, if an adult of an average physical size is struck by the vehicle, his or her head usually hits the hood of the vehicle approximately 120 ms after collision when the vehicle is traveling at 40 km/h, thus consuming much time in discriminating between an impact with the pedestrian and other types of impacts. The hood or the airbag must, therefore, be lifted up or deployed completely in a very short space of time, which requires the need for enhancing the performance of the system. This results in increases in size of the system and/or electric power consumed by the system, thus leading to an increase in manufacturing cost and a difficulty in mounting the system on motor vehicles.

SUMMARY OF THE INVENTION

It is therefore a principal object of the invention to avoid the disadvantages of the prior art.

It is another object of the invention to provide a simple and power-saving structure of a pedestrian-vehicle collision detecting apparatus for vehicles which is capable of discriminating between impacts with pedestrians and other sorts of impacts accurately and quickly.

According to one aspect of the invention, there is provided a pedestrian collision detecting apparatus which may be employed in motor vehicles to distinguish between impacts with pedestrian and other sorts of impacts. The pedestrian collision detecting apparatus comprises: (a) a collision duration determining circuit working to determine a collision duration for which an object is being hit by a vehicle after collision of the vehicle with the object; (b) a collision condition monitoring circuit working to monitor a change in number of locations of collisions of the vehicle with objects in a lateral direction of the vehicle; and (c) a pedestrian-vehicle collision decision circuit working to decide that the object being hit by the vehicle is a pedestrian when the collision duration is smaller than a given threshold value and when the change in number of the locations of the collisions is detected by the collision condition monitoring circuit.

The use of a combination of the collision duration and the change in the locations of the collisions enables a quick discrimination between impacts with pedestrian and other sorts of impacts as compared with the conventional systems, as discussed in the introductory part of this application. This provides enough time for actuating a pedestrian protection system such as an airbag and allows the size and production costs of the system to be decreased, thus improving the mountability of the system in the vehicles.

In the preferred mode of the invention, the collision condition monitoring circuit works to monitor the change in the number of the locations arising from a fact that one of legs of a pedestrian has struck up by the vehicle.

The pedestrian collision detecting apparatus also includes a speed sensor which measures a speed of the vehicle. The pedestrian-vehicle collision decision circuit works to collect one of the collision duration and the given threshold value as a function of the speed of the vehicle.

The collision condition monitoring circuit includes a line sensor equipped with a plurality of conductive lines which extend at a given interval away from each other and make a contact therebetween upon application of a physical impact with an object and a detector circuit working to detect occurrence and a location of collision with the object based on a change in electric parameter associated with impedance between the conductive lines.

The line sensor may be made up of a pair of conductive lines. One of the conductive lines is connected at an end thereof to a first impedance element and at the other end to a second impedance element, wherein a voltage is applied across the conductive lines through the first and second impedance elements. The collision condition monitoring circuit works to monitor the change in the number of the locations arising from a fact that one of legs of a pedestrian has struck up by the vehicle based on voltage drops across the first and second impedance elements.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 7(*b*) is a sectional view which shows a line sensor on which a physical impact acts upon collision with an object;

FIG. 8(*b*) is a sectional view which shows a modified form of a line sensor on which a physical impact acts upon collision with an object;

DESCRIPTION OF THE PREFERRED EMBODIMENTS

Figure 3:
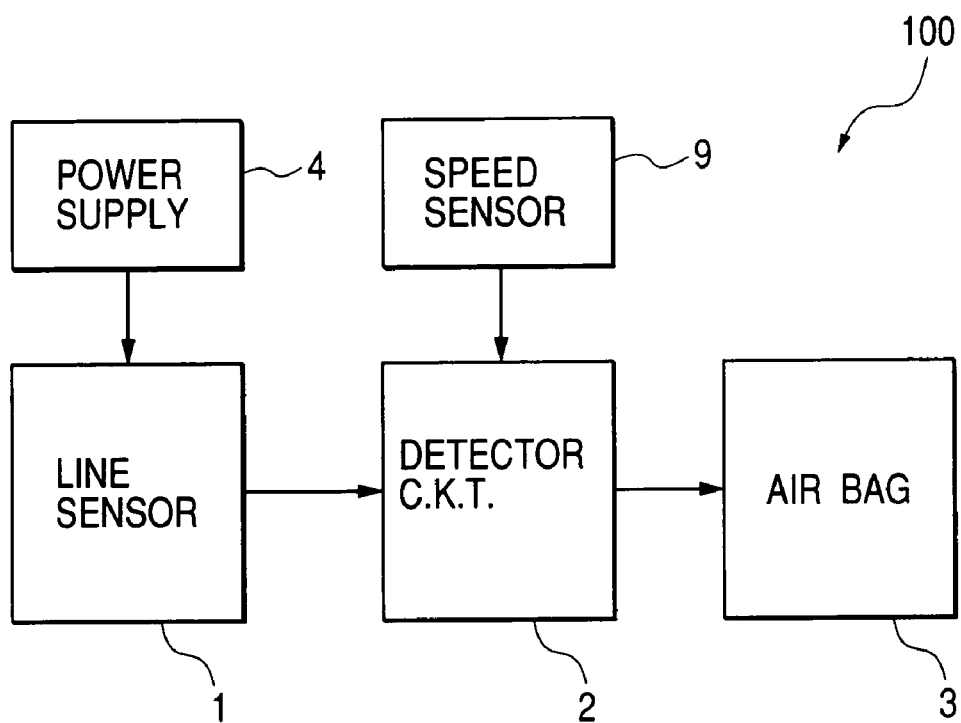
FIG. 3 is a block diagram which shows a pedestrian contact guard device according to the invention.
Figure 4:
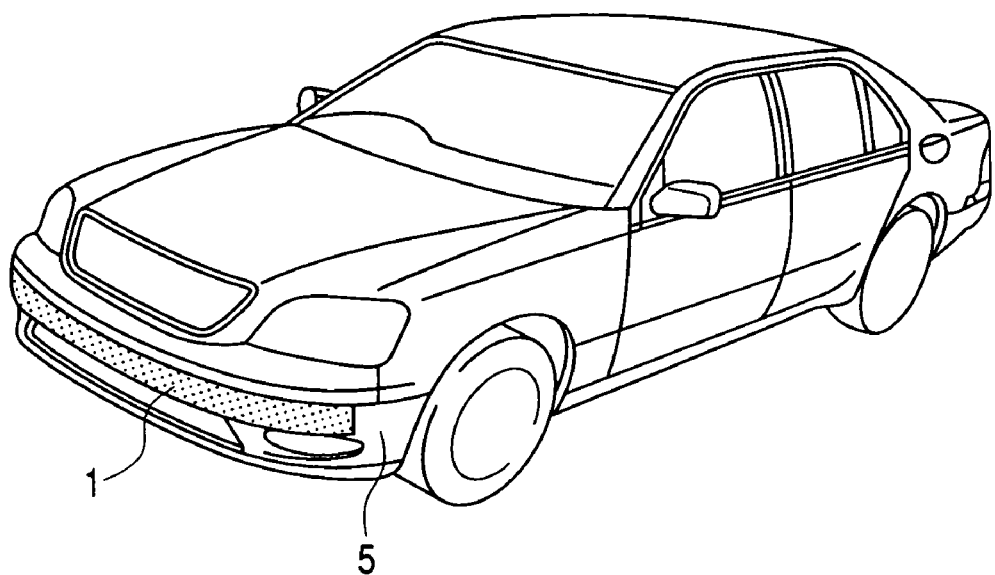
FIG. 4 is a perspective view which shows a motor vehicle in which the pedestrian contact guard device, as illustrated in FIG. 3, is mounted.

Referring to the drawings, wherein like reference numbers refer to like parts in several views, particularly to FIGS. 3 and 4, there is shown a pedestrian contact guard device 100 according to the first embodiment of the invention which is mounted in, for example the front of a motor vehicle.

The pedestrian contact guard device 100 consists essentially of a line sensor 1 made up of a plurality of conductive lines, a detector circuit 2, a plurality of pedestrian protection airbags 3, a power supply 4, and a speed sensor 9. The line sensor 1, the detector circuit 2, and the power supply 4 constitute a pedestrian collision detecting device which works to monitor a condition of an accidental collision of the vehicle with a pedestrian. The detector circuit 2 works to receive an output from the line sensor 1 and determine occurrence of a pedestrian collision and an area of the front (i.e., a bumper) of the vehicle on which a pedestrian impact acts. The airbags 3 are mounted on an upper surface of the front of the vehicle. The power supply 4 supplies electric power to the line sensor 1 and the detector circuit 2. The speed sensor 9 measures the speed of the vehicle and output a signal indicative thereof to the detector circuit 2.

Figure 5:
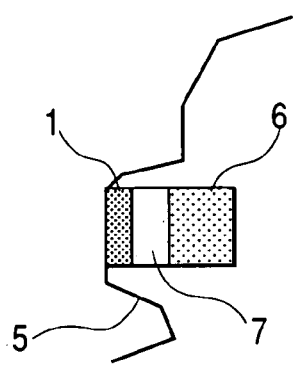
FIG. 5 is a sectional view which shows a line sensor installed on a bumper of a vehicle.
Figure 6:
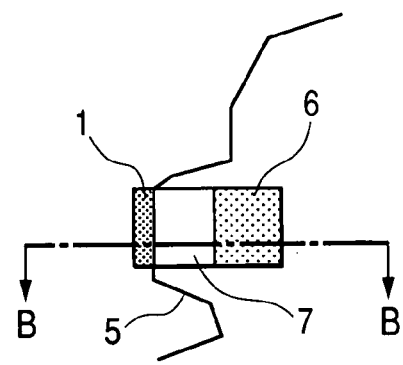
FIG. 6 is a sectional view which shows another form of installation of a line sensor in a bumper of a vehicle.

The line sensor 1 is, as clearly shown in FIGS. 4 and 5, glued onto a bumper cover 5 and extends laterally of the vehicle. The line sensor 1 is made of a pressure sensitive variable resistance tape (also called a pressure sensitive film) which is, as is well known in the art, implemented by a laminate of an elastic film and non-resistive conductive films affixed to opposed surfaces of the elastic film. The elastic film is made of, for example, a conductive rubber over which carbon particles are dispersed. The line sensor 1 may be affixed either to an inside surface, as shown in FIG. 5, or to an outside surface, as shown in FIG. 6, of the bumper cover 5. In FIGS. 5 and 6, a reference number 6 indicates a bumper reinforcement to which a polyurethane foam cushion 7 is glued. One of the conductive films of the line sensor 1 is connected to ground, while the other conductive film is applied with a high voltage through a resistor.

Figure 7A:
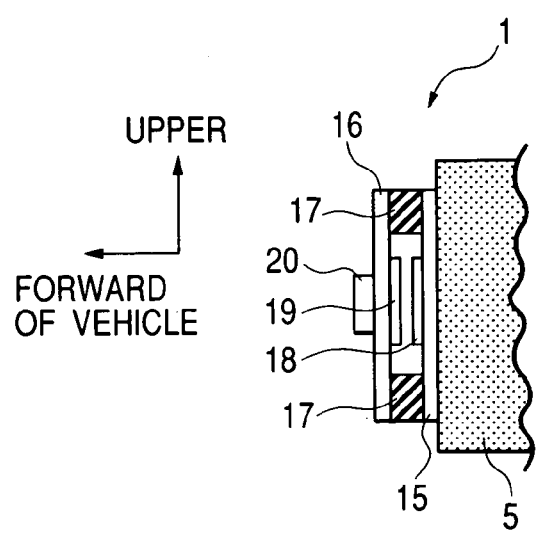
FIG. 7(*a*) is a sectional view which shows a line sensor on which no impact acts.
Figure 7B:
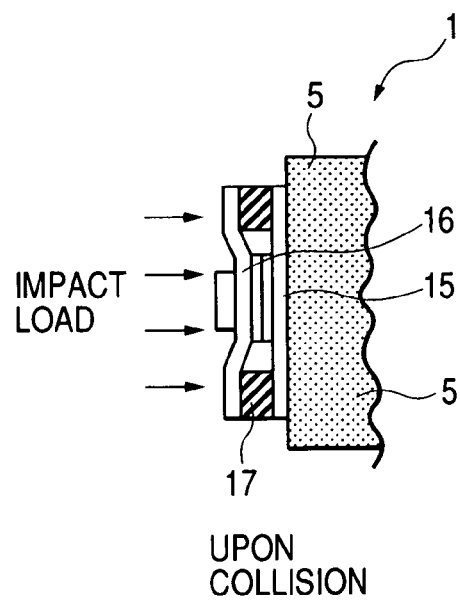

The line sensor 1 may alternatively be, as shown in FIGS. 7(*a*) and 7(*b*), implemented by an elastically deformable conductive line sensor which is made up of conductive plates 15 and 16, electrically insulating spacers 17, contactors 18 and 19, and a rib 20. The conductive plate 15 is secured to the bumper cover 5. The conductive plate 16 are retained by the conductive plate 15 through the spacers 17. The conductive plate 16 may alternatively be mounted directly to the bumper cover 5 through the spacers 17.

The conductive plate 16 faces the conductive plate 15 through a given gap. The contactor 18 is mounted on the conductive plate 15. The conductor 19 is mounted on the conductive plate 16 and opposed to the contactor 18 through an air gap. The conductive plate 16 is made of a metallic member having greater elasticity. FIG. 7(*a*) illustrates for the case where no physical impact acts on the line sensor 1. FIG. 7(*b*) illustrates for the case where a physical impact acts on the line sensor 1 upon collision of the vehicle with an object. When an impact load acts on the conductive plate 16, it causes the conductive plate 16 to be deformed elastically or sink, so that the contactor 19 meets the contactor 18, thereby establishing an electric communication between the contactors 18 and 19.

Figure 8A:
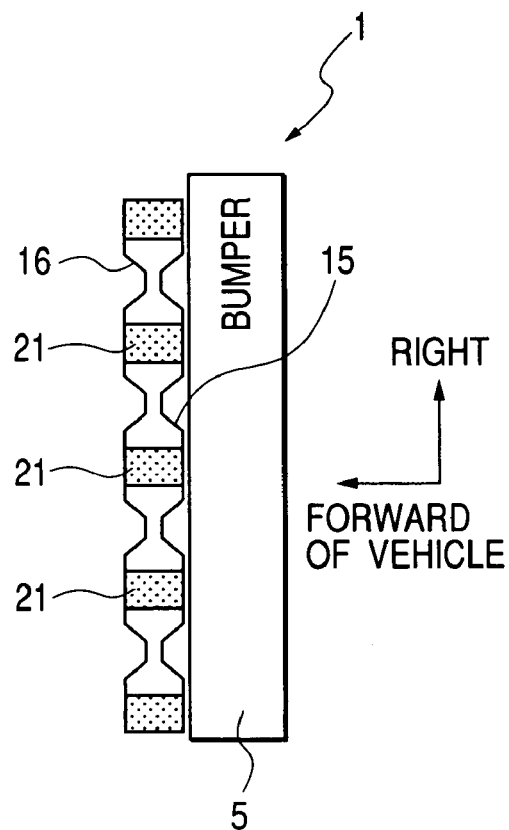
FIG. 8(*a*) is a sectional view which shows a modified form of a line sensor on which no impact acts.
Figure 8A:
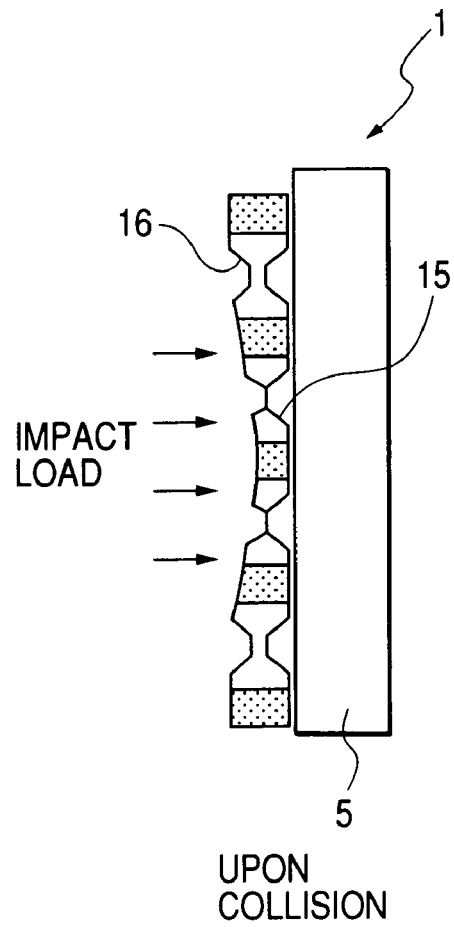

FIGS. 8(*a*) and 8(*b*) show a third modification of the line sensor 1. The line sensor 1 is made up of conductive plates 15 and 16 and elastic insulating spacers 21 made of rubber. Each of the conductive plates 15 and 16 is corrugated. Each of the spacers 21 is interposed between opposed peaks of the conductive plates 15 and 16. The rib 20, as illustrated in FIGS. 7(*a*) and 7(*b*), may also be provided on the conductive plate 16. FIG. 8(*a*) illustrates for the case where no collision impact acts on the line sensor 1. FIG. 8(*b*) illustrates for the case where a collision impact acts on the line sensor 1. Upon application of the impact load to the conductive plate 16, the conductive plate 16 sinks to compress the spacers 21 to make an electric contact between the conductive plates 15 and 16.

Figure 9:
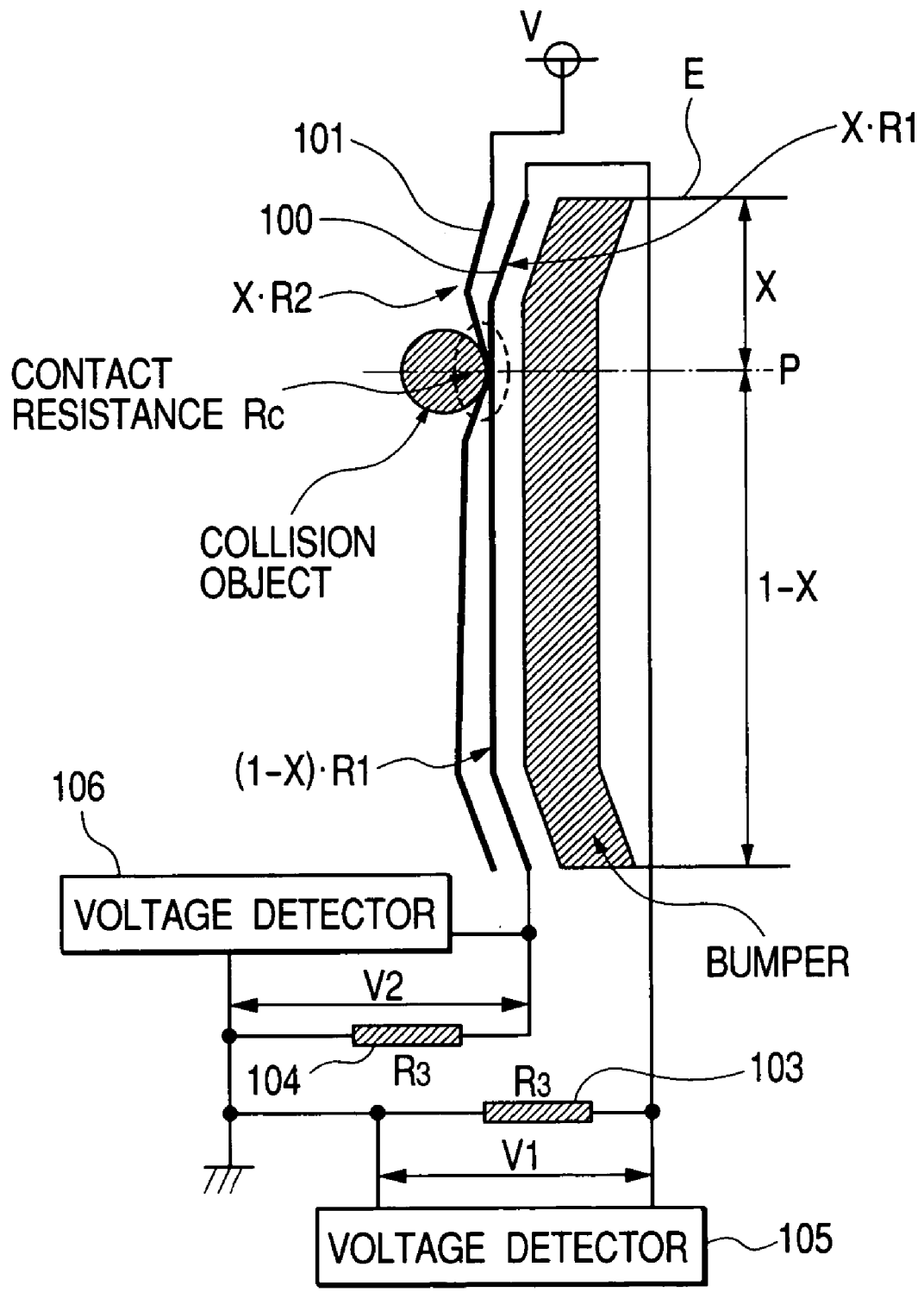
FIG. 9 is a view which shows a structure of a line sensor when an object is hit by a vehicle.

The principle of operation of the detector circuit 2 will be described below with reference to FIGS. 9 and 10. Reference numbers 100 and 101 indicate conductive lines made of strip electrodes which correspond to the conductive films or the conductive plates 15 and 16, as described above. The conductive line 101 has a degree of elasticity required to be responsive to impact with a pedestrian to make contact with the conductive line 100. Upon disappearance of the impact, the conductive line 101 moves away from the conductive line 100 by its own elasticity.

The conductive line 100 has a specific resistance R1. The conductive line 101 has a specific resistance R2. Rc indicates a resistance value when the conductive line 101 meets the conductive line 100 and is assumed here to be zero (0).

The conductive line 101 is connected at an end thereof to a voltage source (e.g., a battery installed in the vehicle) and applied with a dc voltage V The conductive line 100 is connected at one end thereof to ground through a resistor 103 having a resistance value R3 and at the other end to ground through a resistor 104 having the resistance value R3. A voltage detector 105 measures a voltage drop V1 across the resistor 103. A voltage detector 106 measures a voltage drop V2 across the resistor 104.

P indicates a position where an object collides with the line sensor 1 (i.e., the conductive line 101). X indicates a distance between the end E1 of the conductive line 101 to which the dc voltage is applied and the collision position P. 1−X indicates a distance between the end E2 of the conductive line 101 to which no dc voltage is applied and the collision position P. Thus, a resistance value of the conductive line 100 between the end E1 and the collision position P is expressed by X·R1. A resistance value of the conductive line 101 between the end E2 and the collision position P is expressed by (1−X)·R2. The distance X, as will be described below, may be calculated using either or both of the voltage drops V1 and V2.

Specifically, the distance X may be calculated by a formula, as shown below, using the voltage drop V1.

$$R1 \cdot R1 \cdot V1 \cdot X \cdot X = ((R1 \cdot R1 + R1 \cdot R2 + 2R2 \cdot R3)V1 + R1 \cdot R3 \cdot V)X + (R1 \cdot R3 + R3 \cdot R3)V1 - (R1 \cdot R3 + R3 \cdot R3)V$$

The distance X thus determined will also be referred to as a distance X2 below.

The distance X may also be calculated by a formula, as shown below, using the voltage drop V2.

$$R1 \cdot R1 \cdot V2 \cdot X \cdot X = ((R1 \cdot R1 + R1 \cdot R2 + 2R2 \cdot R3)V2 - R1 \cdot R3 \cdot V)X + (R1 \cdot R3 + R3 \cdot R3)V2 - R3 \cdot R3 \cdot V$$

The distance X thus determined will also be referred to as a distance X3 below.

The distance X may also be calculated by a formula, as shown below, using both the voltage drops V1 and V2.

$$(V1+V2) R1 \cdot X = (R1+R3) V2 - R3 \cdot V1$$

The distance X thus determined will also be referred to as a distance X1 below.

Figure 1:
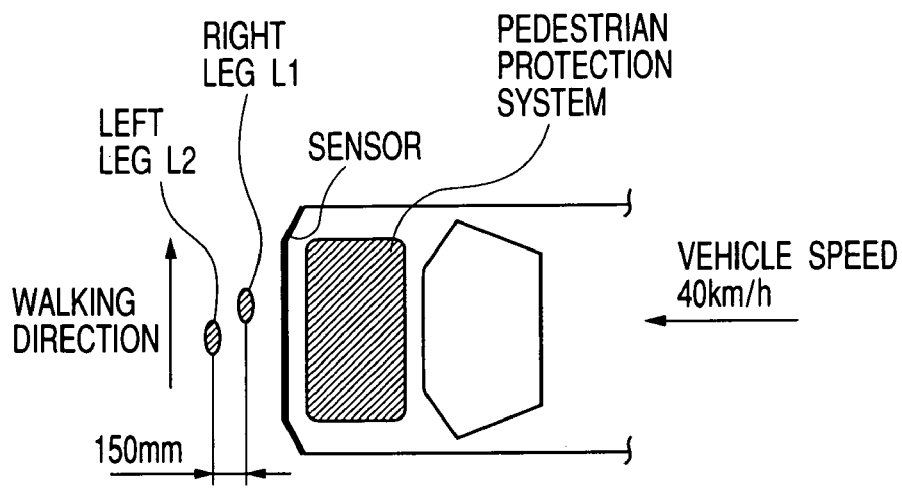
FIG. 1 is a schematic view which shows an example of a pedestrian-vehicle collision.
Figure 2:
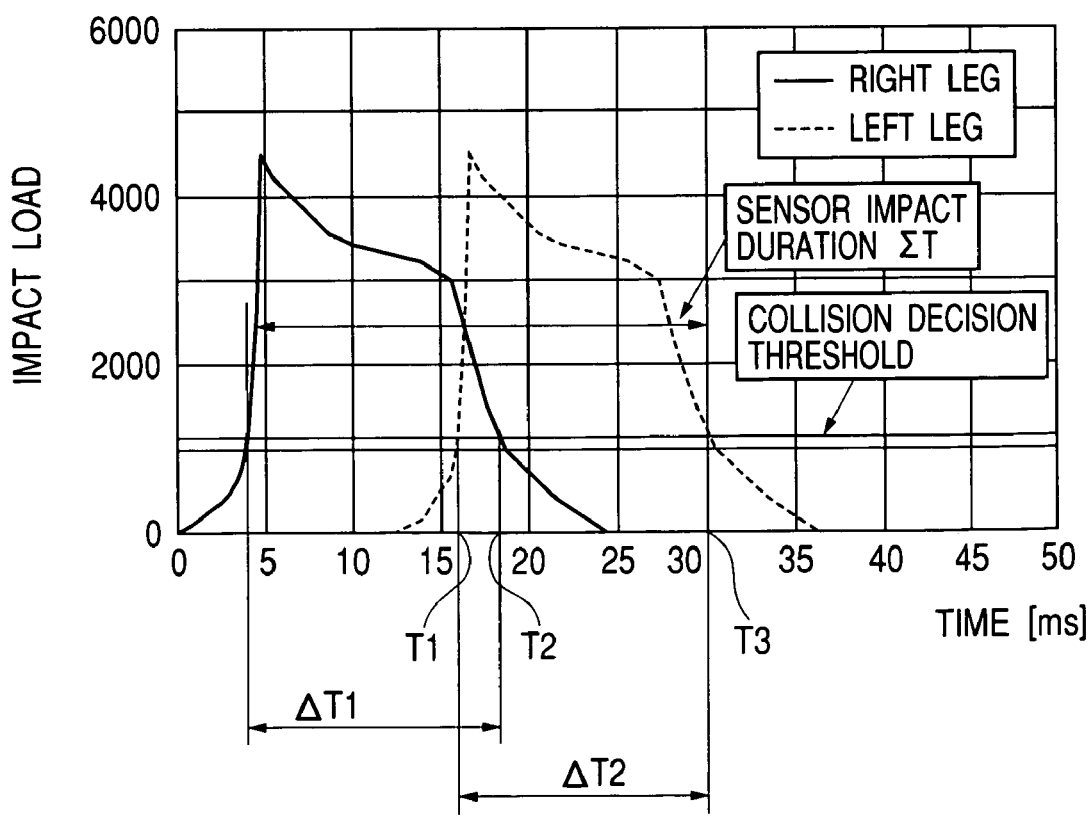
FIG. 2 is a graph which shows a relation between an impact load acting on a sensor and a duration for which the sensor continues to sense the impact load.
Figure 10:
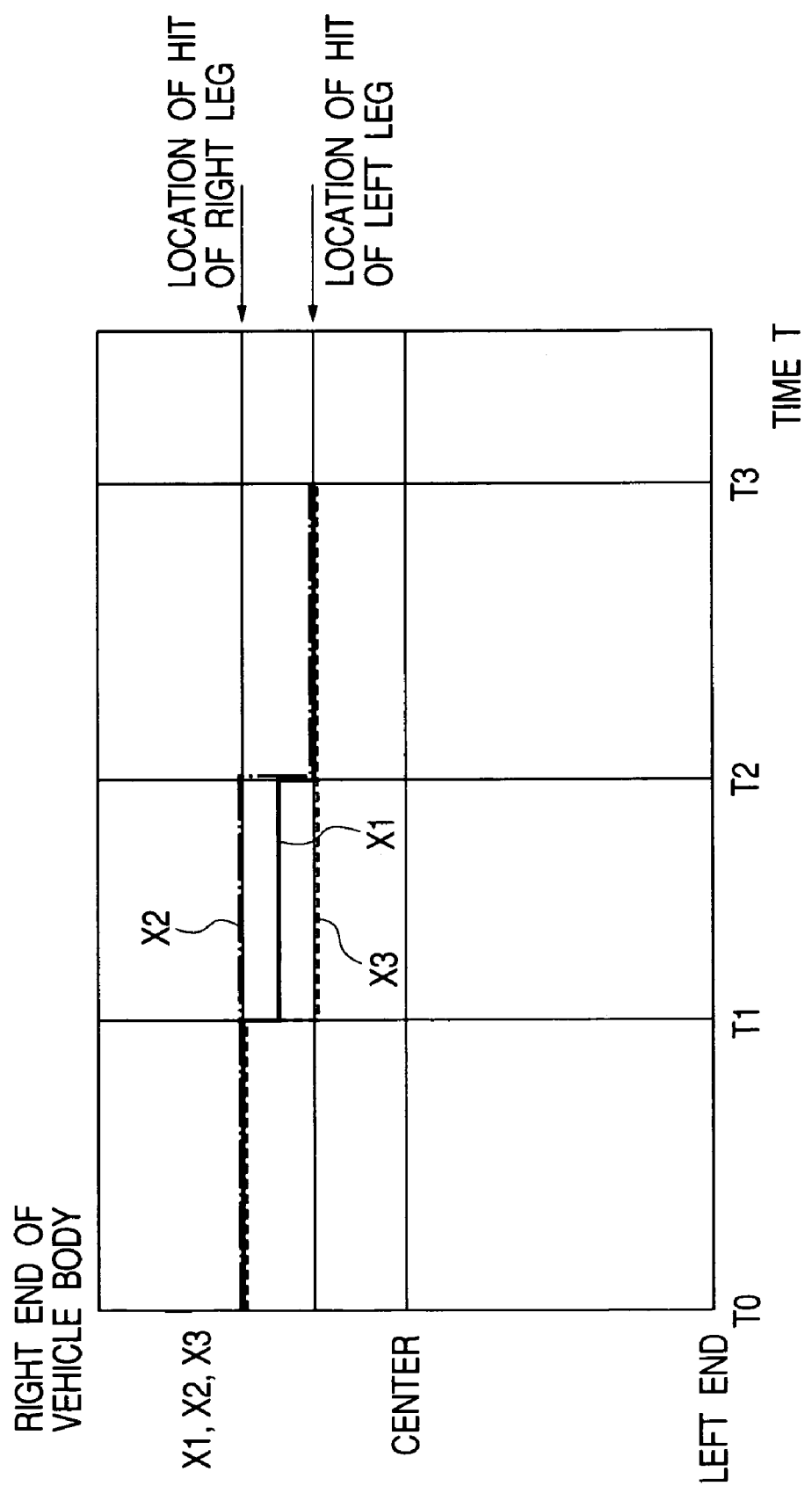
FIG. 10 is a graph which shows an example of time-sequential changes in distances, as calculated by a pedestrian-collision detecting apparatus of the invention, to objects.

FIG. 10 demonstrates changes in distances X1, X2, and X3 with time in the event of a vehicle-pedestrian collision, as shown in FIGS. 1 and 2. T0 denotes a time when the right leg of a pedestrian is hit by the vehicle. T1 denotes a time when the left leg of the pedestrian is hit by the vehicle with the right leg contact with the vehicle. T2 denotes a time when the right leg is struck up by the vehicle away from the line sensor 1. T3 denotes a time when the left leg is struck up by the vehicle away from the line sensor 1.

The graph of FIG. 10 shows that the distances X1, X2, and X3 are different from each other between the times T1 and T2, that is, during a time when the conductive line 101 meets the conductive line 100 at two points. Therefore, use of any two of the distances X1, X2, and X3 between the times T1 and T2 enables a pedestrian collision at the time T2 to be discriminated from that at the time T1, thereby making it possible to determine the moment one of the legs of the pedestrian which has been first hit by the vehicle is struck or kicked up by the vehicle while the other leg is in contact with the vehicle. Thus, when a collision duration that is defined by an interval between the times T0 and T2 is less than a given threshold value (e.g., 20 msec.), it may be determined that the vehicle is hitting a pedestrian. The reason that the distances X1, X2, and X3 at the time T1 are not used in determining the vehicle-pedestrian collision is because collisions with objects other than pedestrians may result in changes in the distances X1, X2, and X3, like in FIG. 10.

Figure 11:
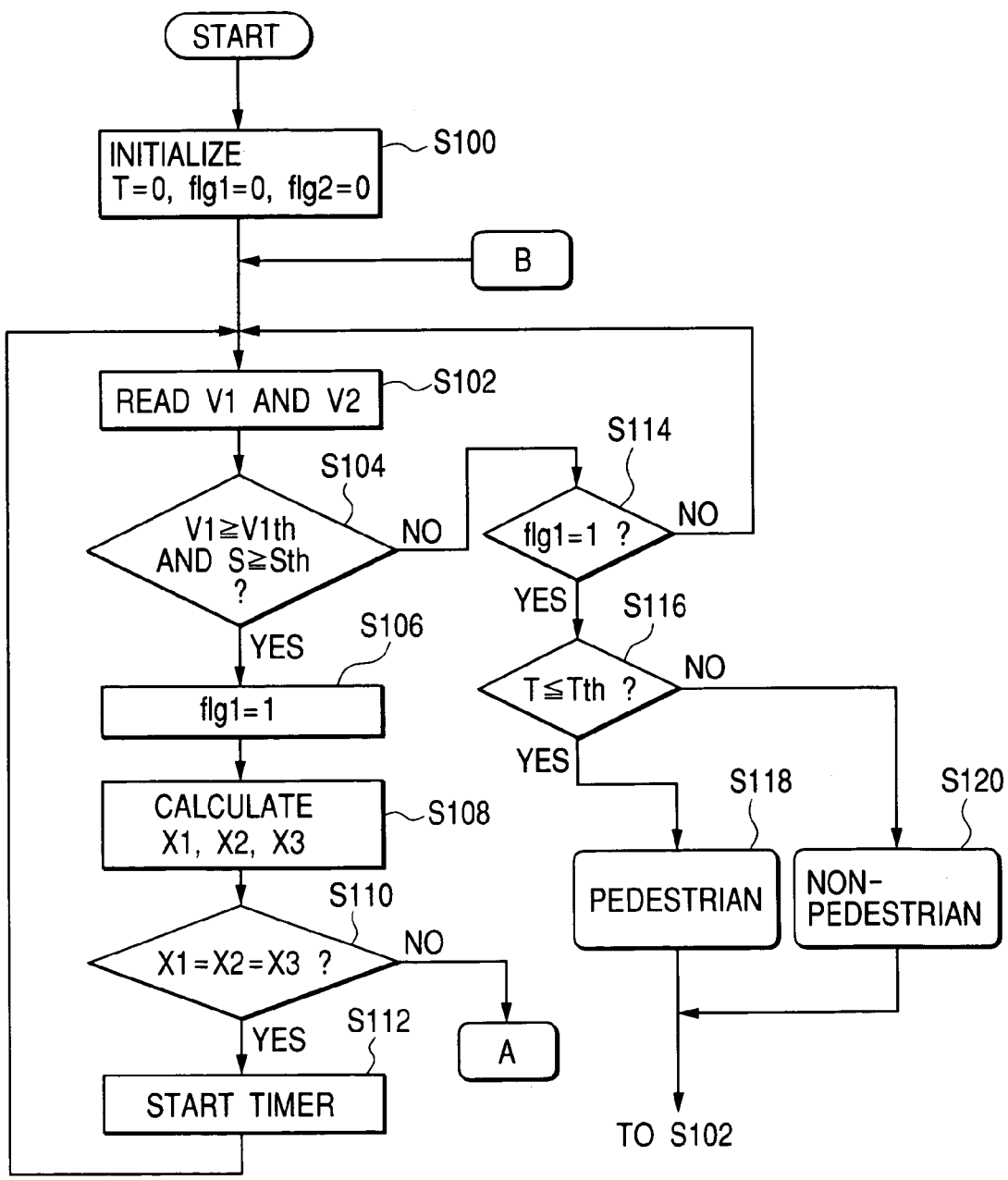
FIGS. 11 and 12 show a flowchart of a program performed by a pedestrian-collision detecting apparatus according to the first embodiment of the invention.

FIG. 11 is a flowchart of logical steps or program performed by a microcomputer installed in the detector circuit 2 to discriminate between a pedestrian and a heavy object other than the pedestrian.

Upon turning on of an ignition switch of the vehicle, the power is supplied from the power supply 4 to the detector circuit 2 to initialize in step 100 a count value T, as counted by a built-in timer, and a collision flag flg1 indicating that the vehicle has hit an object, and a multi-collision flag flag2 indicating that collisions with objects have occurred at a plurality of locations of the front of the vehicle to zero (b 0).

The routine proceeds to step 102 wherein the voltage drops V1 and V2 are measured through the voltage detectors 105 and 104, and the speed S of the vehicle is measured using a known sensor.

The routine proceeds to step 104 wherein it is determined whether the voltage drop V1 is greater than or equal to a given threshold value V1th, and the vehicle speed S is greater than or equal to a given threshold value Sth (e.g., 20 km/h) or not. If a YES answer is obtained meaning that the voltage drop V1 and the vehicle speed S are greater than or equal to the threshold values V1th and Sth, respectively, then the routine proceeds to step 106 wherein the collision flag flag1 is set to one (1) meaning that an object-vehicle collision has occurred. The routine proceeds to step 108 wherein the distances X1, X2, and X3 are determined in the manner as described above.

The routine proceeds to step 110 wherein it is determined whether the distances X1, X2, and X3 are substantially equal to each other or not. If a YES answer is obtained meaning that the current time lies between the times T0 and T1 and that an object-vehicle collision is occurring at a single location of the front of the vehicle, then the routine proceeds to step 112 wherein the built-in timer is started to count the collision duration and returns back to step 102. If a NO answer is obtained in step 110, it is determined that object-vehicle collisions are occurring at a plurality of locations of the front of the vehicle. If any two of the distances the distances X1, X2, and X3 are equal to each other, it may also be determined that the object-vehicle collision is occurring at a single location.

If a NO answer is obtained in step 104 meaning that the line sensor 1 is in an off-state or any object is hitting the vehicle, but the speed of the vehicle is very low or resting, then the routine proceeds to step 114 wherein it is determined whether the collision flag flg1 shows one (1) or not, that is, whether the vehicle has hit any object or not. If a NO answer is obtained, then the routine returns back to step 102. Alternatively, if a YES answer is obtained, then the routine proceeds to step 116 wherein it is determined whether the count value T, as counted from the time T0, is less than the given threshold value Tth (e.g., 20 msec.) or not. If a YES answer is obtained (T≦Tth), then the routine proceeds to step 118 wherein the vehicle is hitting a pedestrian, and triggering signals are outputted to deploy the airbags 3. Alternatively, if a NO answer is obtained, then the routine proceeds to step 120 wherein it is determined that the vehicle is hitting an object other than a pedestrian and returns back to step 102.

Figure 12:
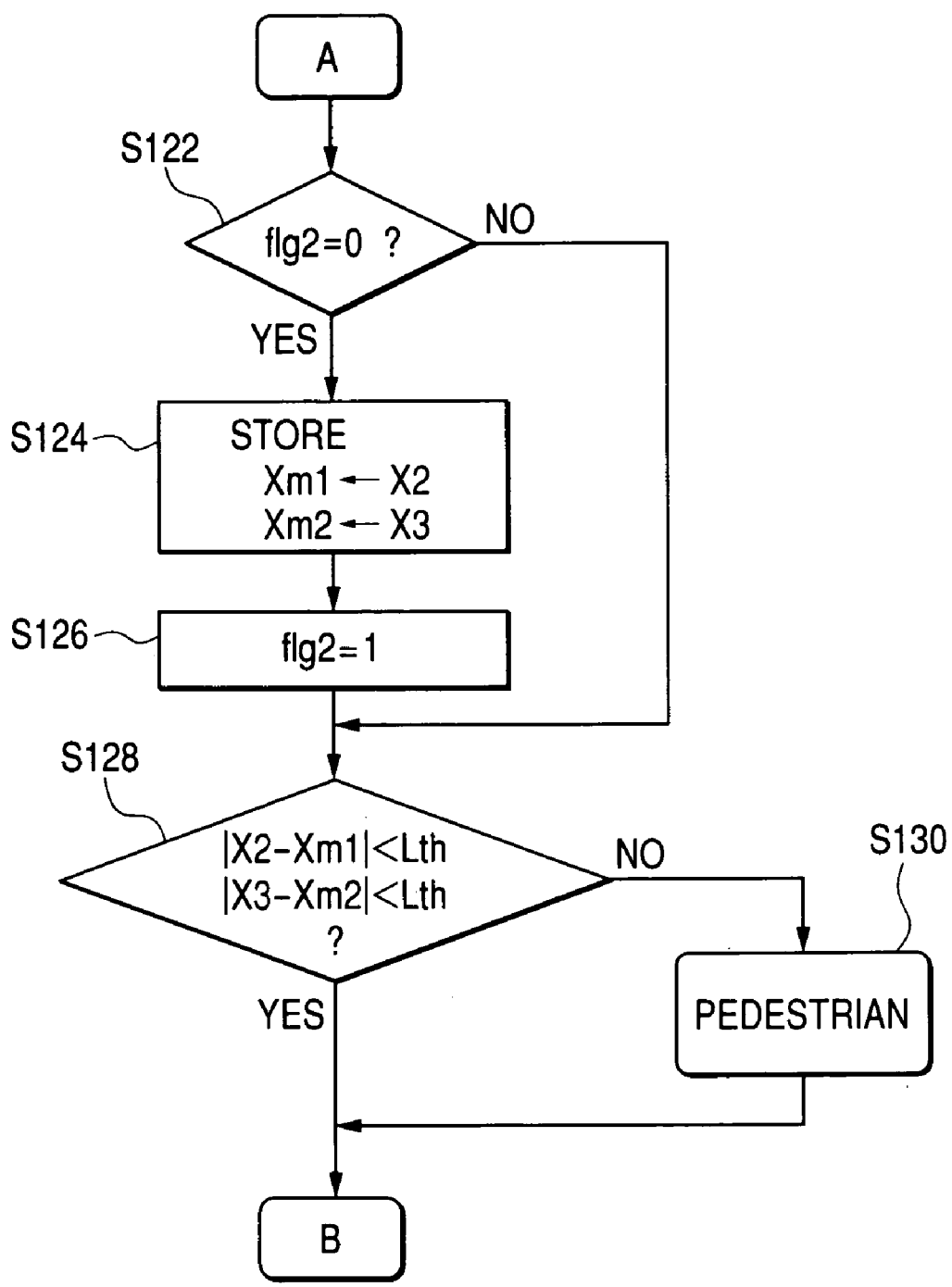

If a NO answer is obtained in step 110 meaning that the distances X1, X2, and X3 are different from each other and that object-vehicle collisions have occurred at a plurality of locations of the front of the vehicle, then the routine proceeds to step 112, as shown in FIG. 12, wherein it is determined whether the multi-collision flag flg2 shows zero (0) or not, that is, whether a condition wherein multiple object-vehicle collisions are occurring at a plurality of locations has been first encountered or not. If a YES answer is obtained, then the routine proceeds to step 124 wherein the distances X2 and X3 are determined as initial collision distances Xm1 and Xm2, respectively, and stored in a built-in memory of the detector circuit 2. The routine proceeds to step 126 wherein the multi-collision flag flg2 is set to one (1). If a NO answer is obtained in step 122 meaning that the multi-collision flag flg2 is one (1), then the routine proceeds directly to step 128 wherein a condition at the time T2 has been encountered or not.

Specifically, in step 128, it is determined whether an absolute value of a difference between the distance X2, as calculated in this program execution cycle, and the initial collision distance Xm1 is smaller than a given threshold value Lth or not and whether an absolute value of a difference between the distance X3, as calculated in this program execution cycle, and the initial collision distance Xm2 is smaller than the threshold value Lth or not. If these conditions are both met meaning that a condition wherein multiple object-vehicle collisions are occurring remains unchanged, in other words, that locations of the multiple object-vehicle collisions remain unchanged, the routine returns back to step 102 in FIG. 11. Alternatively, if only one of the two conditions in step 128 is not met meaning that one of the legs of a pedestrian which was first hit by the vehicle has been struck up from the front of the vehicle, thus resulting in a decrease in number of the locations of the object-vehicle collisions, then the routine proceeds to step 130 wherein it is determined that the vehicle is hitting a pedestrian, and triggering signals are outputted to deploy the airbags 3. The routine then returns back to step 102.

The reason whey changes in distances X2 and X3 are both checked in step 128 is because when an object hits any portion of a half of the line sensor 1 on the side of the end leading to the voltage source (i.e., an upper half as viewed in FIG. 9), it causes the distances X2 and X3 to change, as illustrated in FIG. 10, while when an object hits any portion of the remaining half of the line sensor 1 (i.e., a lower portion as viewed in FIG. 9), it causes the distances X2 and X3 to change in a pattern reverse to that in FIG. 10, that is, that either one of the distances X2 and X3 changes at each of the times T2 and T3.

The determination in step 128 of whether the multiple object-vehicle collisions taken placed at a plurality of locations of the front of the vehicle have been decreased or not may alternatively be made based on facts, as described below.

As apparent from FIG. 10, if after it is determined in step 110 that object-vehicle collisions have occurred at a plurality of locations of the front of the vehicle, the distances X1, X2, and X3 become equal to each other again, it means that the number of locations of collisions of the vehicle with objects is decreased to one (1), that is, that a object-vehicle collision condition has been returned from a multi-collision condition in which a plurality of objects (i.e., both legs of a pedestrian) are being hit by the vehicle to a single collision condition in which a single object (i.e., one of legs of a pedestrian) is being hit by the vehicle, which is detected at the time T2. If two of the distances X1, X2, and X3 become nearly equal to each other, it also means that the object-vehicle collision condition has been returned from the multi-collision condition to the single collision condition. Moreover, if the distances X1 and X2 are identical with the distance Xm2 or the distances X1 and X3 are identical with the distance Xm1, it also means that the object-vehicle collision condition has been returned from the multi-collision condition to the single collision condition.

Further, between the times T0 and T3, the distance X1 always changes in each of the events at the times T1 and T2. Thus, if after a change in distance X1 is detected, a change in either of the distances X2 and X3 exceeds a given value, it may be concluded that the time T2 has been reached.

Furthermore, the distance X1 changes by a given amount when the multi-collision condition is encountered at the time T1 and also changes by a given amount in the same direction (i.e., toward the center of the vehicle in the example of FIG. 10) upon disappearance of the multi-collision condition at the time T2. A quick determination of whether a pedestrian is hit by the vehicle or not may, therefore, be made by starting the timer to count upon detection of a collision at the time T0, stopping the timer upon detection of the second sharp change in the distance X1, and comparing the count value with a given threshold value.

Figure 13:
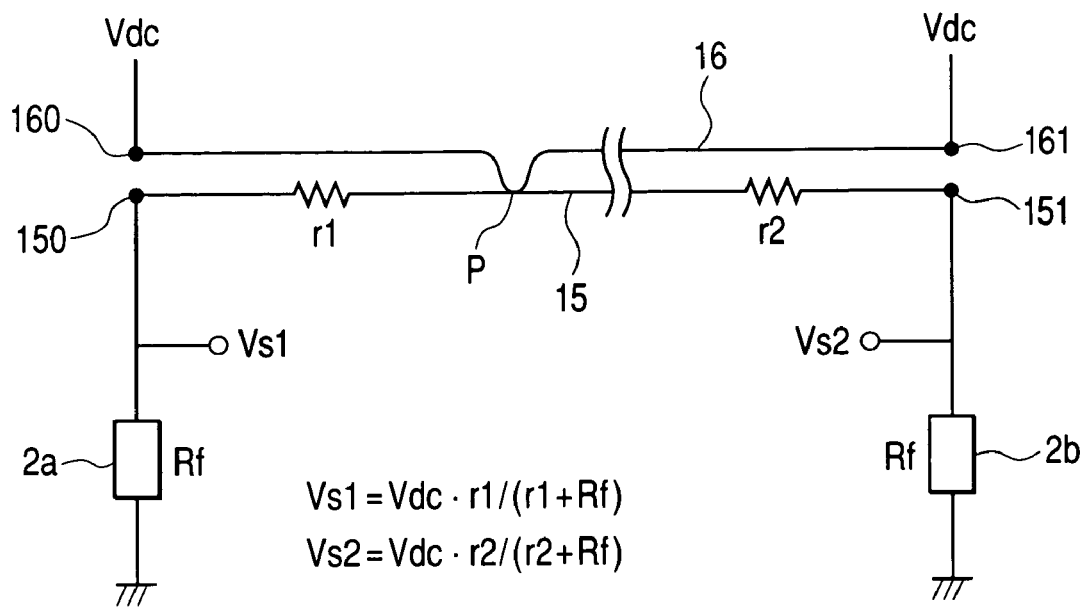
FIG. 13 shows a contact between conductive lines of a line sensor according to the second embodiment of the invention when a single object is hit by a vehicle.
Figure 14:
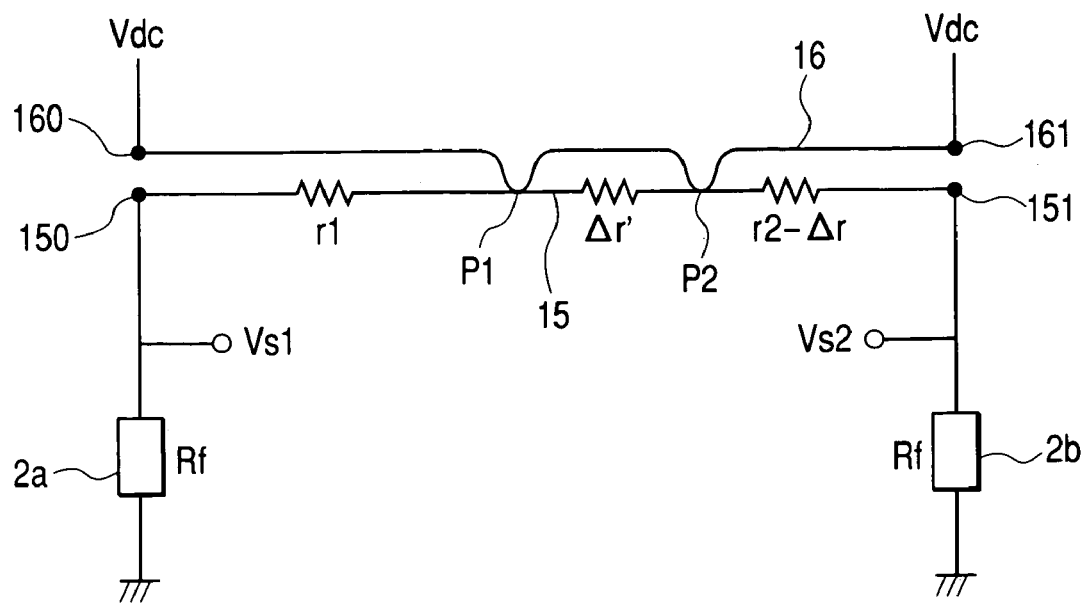
FIG. 14 shows contacts between the conductive lines of the line sensor of FIG. 13 when two objects are hit by a vehicle.
Figure 15:
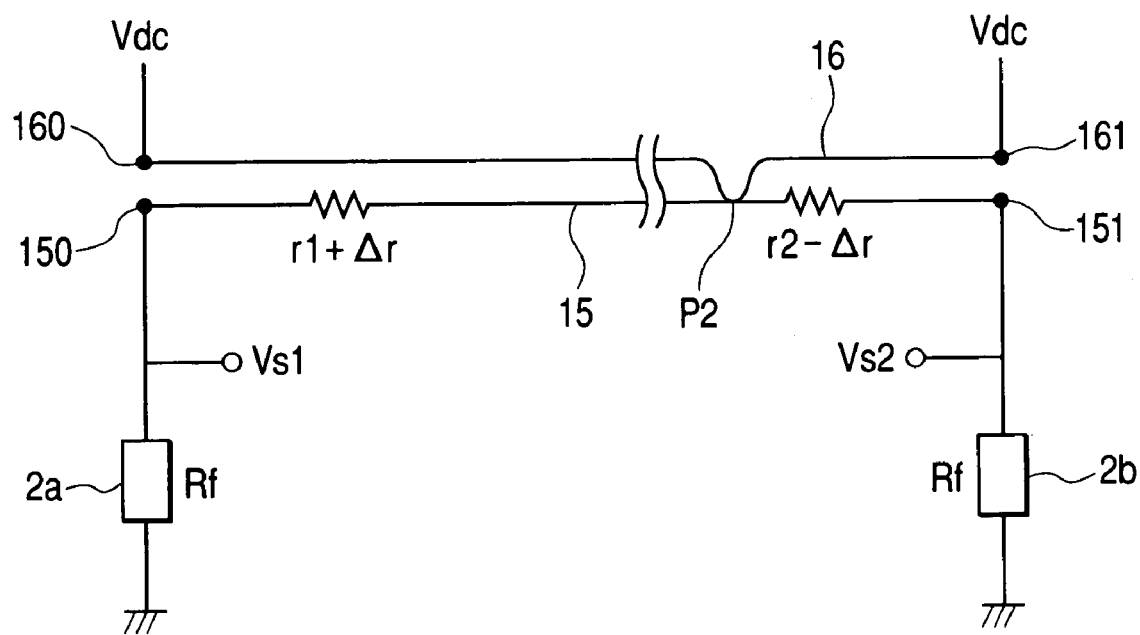
FIG. 15 shows a contact between the conductive lines of the line sensor of FIG. 13 when one of the two objects, as illustrated in FIG. 14, disappears.

FIGS. 13 to 15 show the second embodiment of the invention. The same reference numbers as employed in the first embodiment refer to the same parts, and explanation thereof in detail will be omitted here. Note that the conductive plate 16, as illustrated, faces forward of the vehicle and has a protrusion, as denoted at P, arising from deformation thereof upon collision with a pedestrian, but the conductive plate 15 may alternatively be located in front of the conductive plate 16 and have such a protrusion.

The conductive plate 15 is made of a resistive line having a specific resistance. The conductive plate 16 is made of an electrode line made of, for example, a copper plate having a greater conductivity. The conductive plate 16 has ends 160 and 161 to which a high dc voltage Vdc is applied. The conductive plate 15 has an end 150 connected to ground through a resistor 2a and at an end 151 connected to ground through a resistor 2b. In an alternative form, the conductive plate 16 may have a portion connected to ground. The high dc voltage Vdc may be applied across the ends of the conductive plate through the resistors 2a and 2b. In this case, the conductive plate 16 may be implemented by a portion of the body of the vehicle or connected directly to the body of the vehicle.

The voltage drop Vs1 across the resistor 2a is given by a fraction of the resistance r1 of a portion of the conductive plate 15 between the end 150 and a collision point P at which an object is hit by the vehicle plus the resistance Rf of the resistor 2a. The voltage drop Vs2 across the resistor 2b is given by a fraction of the resistance r2 of a portion of the conductive plate 15 between the end 151 and the collision point P at plus the resistance Rf of the resistor 2b.

FIG. 14 illustrates for a case where a two-point collision condition (i.e., the multi-collision condition) wherein both legs of a pedestrian are hit by the vehicle is encountered (i.e., the time T1). As can be seen from the drawing, the voltage drop Vs1 across the resistor 2a remains unchanged, while the voltage drop Vs2 across the resistor 2b is increased by a resistance decrease $-\Delta r$ arising from addition of a collision at point P2. FIG. 15 illustrates for a case where the object-vehicle collision condition is returned from the two-point collision condition to the single collision condition (i.e., the time T1). The voltage drop Vs1 across the resistor 2a is increased by a resistance increase $+\Delta r$. The voltage drop Vs2 across the resistor 2b remains unchanged. In a case where one of legs of a pedestrian is first hit by the vehicle at point P2, and the other leg is subsequently hit at the point P1, the voltage drops Vs1 and Vs2 undergo changes reverse to the above.

In operation, the detector circuit 2 determines that the vehicle has hit an object when the voltage drops Vs1 and Vs2 increase simultaneously, that the time T1 has been reached when either of the voltage drops Vs1 and Vs2 increases, and that the time T2 has been reached when the other of the voltage drops Vs1 and Vs2 decreases. Specifically, the detector circuit 2 may decide that the time T2 has been reached, that is, that the object-vehicle collision condition has been returned from the two-point collision condition to the signal collision condition upon decrease in either of the voltage drops Vs1 and Vs2 after impact with an object is sensed by the line sensor 1.

Figure 16:
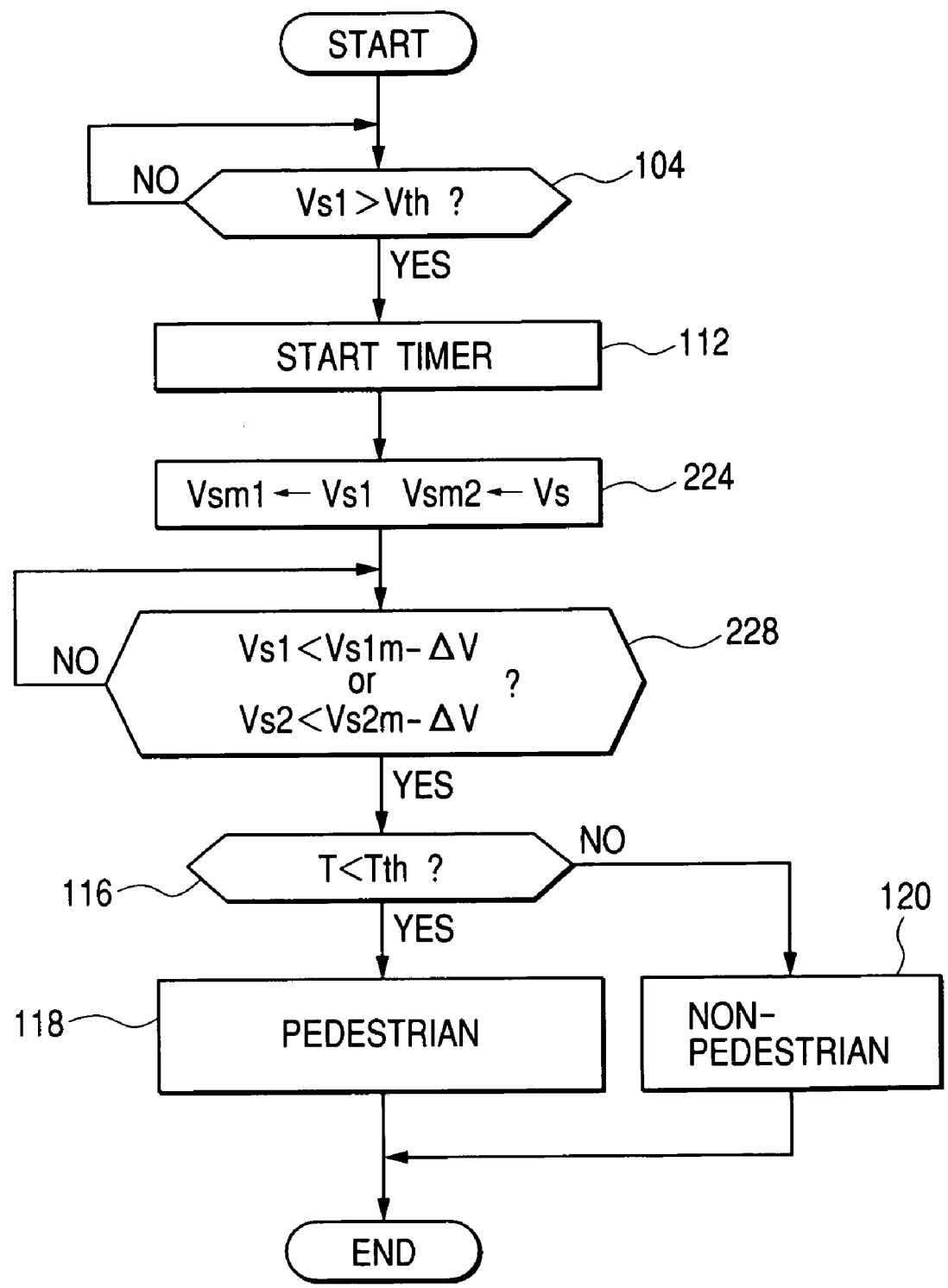
FIG. 16 is a flowchart of a program executed by a pedestrian-collision detecting apparatus according to the second embodiment of the invention.

FIG. 16 shows a flowchart of a program executed by the detector circuit 2 of the second embodiment. Steps, as indicated by the same reference numbers as in FIGS. 11 and 12, identical in operations, and explanation thereof in detail will be omitted here.

In step 224, the voltage drops Vs1 and Vs2 are determined as initial collision voltage drops Vsm1 and Vsm2, respectively, and stored in the built-in memory. In step 228, it is determined whether the initial collision voltage drop Vs1$m$ minus a given margin $\Delta V$ is smaller than the voltage drop Vs1 or not and whether the initial collision voltage drop Vs2$m$ minus the given margin $\Delta V$ is smaller than the voltage drop Vs2 or not. If either of the two conditions is met, the routine proceeds to step 116.

In the above embodiments, the dc voltage source is connected to the line sensor 1 at all the time, but an ac voltage or a pulsed voltage may alternatively be applied to the line sensor 1. The use of the ac voltage offers the advantage that even if the conductive plates 15 and 16 fail to make a physical contact completely at the collision point P, so that the resistance at the contact is great, a great electrostatic capacity is developed at the collision point P between the conductive plates 15 and 16 which serves to make an electric contact between the conductive plates 15 and 15 in an ac form. The use of the ac voltage may eliminate the need for the conductive plate 16 in the following manner. Specifically, the ends of the conductive plate 15 are connected to an ac voltage source through the resistors 2a and 2b. If a pedestrian hits the conductive plate 15, the conductive plate 15 may be viewed as being connected to ground at a point of collision with the pedestrian through a great electrostatic capacitance of the pedestrian. The collision with the pedestrian may, therefore, be detected, like the above embodiments, by measuring voltage drops across the resistors 2a and 2b.

The collision duration usually depends upon the speed of the vehicle. The detector circuit 2 may, therefore, be designed to correct either of the collision duration and the threshold value Tth, as used in step 116 of FIG. 11, as a function of the speed of the vehicle as measured by the speed sensor 9.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A pedestrian collision detecting apparatus for a vehicle comprising:
   a collision duration determining circuit working to determine a collision duration for which an object is being hit by a vehicle after collision of the vehicle with the object;

a collision condition monitoring circuit working to monitor a change in number of locations of collisions of the vehicle with a plurality of contact points of the object in a lateral direction of the vehicle; and a pedestrian-vehicle collision decision circuit working to decide that the object being hit by the vehicle is a pedestrian when the collision duration is smaller than a given threshold value and when the change in number of the locations of the collisions is detected by said collision condition monitoring circuit.

2. A pedestrian collision detecting apparatus as set forth in claim 1, wherein said collision condition monitoring circuit further works to monitor the change in the number of the locations arising from a fact that one of the legs of a pedestrian is projected up by the vehicle.

3. A pedestrian collision detecting apparatus as set forth in claim 1, further comprising a speed sensor which measures a speed of the vehicle, and wherein said pedestrian-vehicle collision decision circuit works to collect one of the collision duration and the given threshold value as a function of the speed of the vehicle.

4. A pedestrian collision detecting apparatus as set forth in claim 1, wherein said collision condition monitoring circuit includes a line sensor equipped with a plurality of conductive lines which extend at a given interval away from each other and make a contact therebetween upon application of a physical impact with the object and a detector circuit working to detect occurrence and at least one of the locations of collision with the object based on a change in an electric parameter associated with impedance between the conductive lines.

5. A pedestrian collision detecting apparatus as set forth in claim 4, wherein the number of the conductive lines is two, wherein one of the conductive lines is connected at an end thereof to a first impedance element and at the other end to a second impedance element, wherein a voltage is applied across the conductive lines through the first and second impedance elements, and wherein said collision condition monitoring circuit works to monitor the change in the number of the locations arising from a fact that one of the legs of a pedestrian is projected up by the vehicle based on voltage drops across the first and second impedance elements.

6. A pedestrian collision detecting apparatus as set forth in claim 1, wherein the pedestrian-vehicle collision decision circuit further is configured to facilitate transmitting a signal to trigger airbag deployment.

7. A pedestrian collision detecting apparatus as set forth in claim 1, wherein the pedestrian-vehicle collision decision circuit is configured to facilitate adjusting the given threshold value as a function of a speed of the vehicle.

* * * * *